US009586568B2

(12) United States Patent
Geissenhoener

(10) Patent No.: US 9,586,568 B2
(45) Date of Patent: Mar. 7, 2017

(54) WARNING SYSTEM GENERATING WARNING FOR PARKING BRAKE AND AUTOMATIC TRANSMISSION OF MOTOR VEHICLE

(71) Applicant: AUDI AG, Ingolstadt (DE)

(72) Inventor: Martin Geissenhoener, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/912,759

(22) PCT Filed: Dec. 16, 2014

(86) PCT No.: PCT/EP2014/003379
§ 371 (c)(1),
(2) Date: Feb. 18, 2016

(87) PCT Pub. No.: WO2015/090568
PCT Pub. Date: Jun. 25, 2015

(65) Prior Publication Data

US 2016/0221564 A1 Aug. 4, 2016

(30) Foreign Application Priority Data

Dec. 19, 2013 (DE) ........................ 10 2013 021 661

(51) Int. Cl.
*B60Q 1/00* (2006.01)
*B60T 17/22* (2006.01)
*B60T 7/12* (2006.01)

(52) U.S. Cl.
CPC ................ *B60T 17/22* (2013.01); *B60T 7/12* (2013.01)

(58) Field of Classification Search
CPC ........ B60T 17/22; B60T 17/18; B60T 1/0005; B60T 1/005; B60T 7/107; B60K 28/00; B60Q 9/001
(Continued)

(56) References Cited

U.S. PATENT DOCUMENTS 3,723,968 A 3/1973 Kelly
4,482,885 A * 11/1984 Mochida ................ B60K 28/00
200/61.88
(Continued)

FOREIGN PATENT DOCUMENTS

DE 3146099 7/1982
DE 69102329 9/1994
(Continued)

OTHER PUBLICATIONS

WIPO English Language Translation of the International Preliminary Report on Patentability for PCT/EP2014/003379, mailed Jun. 30, 2016, 7 pages.
(Continued)

*Primary Examiner* — Hoi Lau
(74) *Attorney, Agent, or Firm* — Staas & Halsey LLP

(57) ABSTRACT

A motor vehicle has an automatic transmission with a P driving stage, a N driving stage and one or more forward and reverse driving stages. The motor vehicle also has an electrical parking brake device, and an assistance system for outputting a warning information and actuating the parking brake device during the opening of the driver's door when the P driving stage is not engaged on the gear side. According to the proposals, the warning information is output only when the parking brake device is not actuated or not actuated in an error-free manner.

18 Claims, 1 Drawing Sheet

1 2 2 7 12 8 9 10 11 13 4 5 3 3 6 6

(58) Field of Classification Search
USPC ....... 340/453, 438, 456, 457.3, 457; 701/53, 701/117, 36, 49
See application file for complete search history.

(56) References Cited

U.S. PATENT DOCUMENTS 4,495,484 A * 1/1985 Kawakatsu ............ B60Q 9/001 200/61.64
5,015,991 A * 5/1991 Barr ....................... B60Q 9/001 340/438
6,246,313 B1 * 6/2001 Baker ................ B60K 31/0008 340/425.5
8,044,788 B2 * 10/2011 Lundgren ............... B60T 17/22 340/453
9,150,208 B2 * 10/2015 Schemmel .............. B60T 17/18
2003/0075981 A1 * 4/2003 Chen ...................... B60Q 9/001 307/10.1
2007/0005229 A1 * 1/2007 Breitenberger ........ G07C 5/008 701/117
2007/0086879 A1 * 4/2007 Goodrich ............... A61G 3/061 414/537
2008/0053761 A1 * 3/2008 Yamamoto ................ B60T 7/12 188/156
2008/0204281 A1 * 8/2008 Sugiura ................... B60R 25/24 340/988
2008/0224841 A1 * 9/2008 Lundgren ............... B60T 17/22 340/453
2008/0255733 A1 * 10/2008 McMillen ............ B60N 2/0232 701/49
2009/0093925 A1 * 4/2009 Gumbel ................. B60Q 1/486 701/36
2009/0111654 A1 4/2009 Hecht et al.
2009/0237023 A1 * 9/2009 Suzuki .................... E05F 15/41 318/453
2012/0078478 A1 * 3/2012 Spaulding ............. F16H 63/483 701/53
2013/0268144 A1 * 10/2013 Du ......................... G08C 17/02 701/2
2013/0314222 A1 * 11/2013 Park ......................... B60Q 1/00 340/453
2015/0336555 A1 * 11/2015 Delannoye .............. B60T 1/005 340/457.3
2015/0369317 A1 * 12/2015 Choe ....................... F16D 65/18 701/70
2016/0221564 A1 * 8/2016 Geissenhoener ....... B60T 17/22

FOREIGN PATENT DOCUMENTS

| | | |
|---|---|---|
| DE | 102007028567 | 2/2008 |
| DE | 102007000556 | 6/2009 |
| DE | 10 2013 021 661.3 | 12/2013 |
| EP | 2165894 | 3/2010 |
| WO | 2009/129933 | 10/2009 |
| WO | PCT/EP2014/003379 | 12/2014 |

OTHER PUBLICATIONS

English language the International Search Report for PCT/EP2014/003379, mailed on Apr. 30, 2015, 2 pages.

* cited by examiner

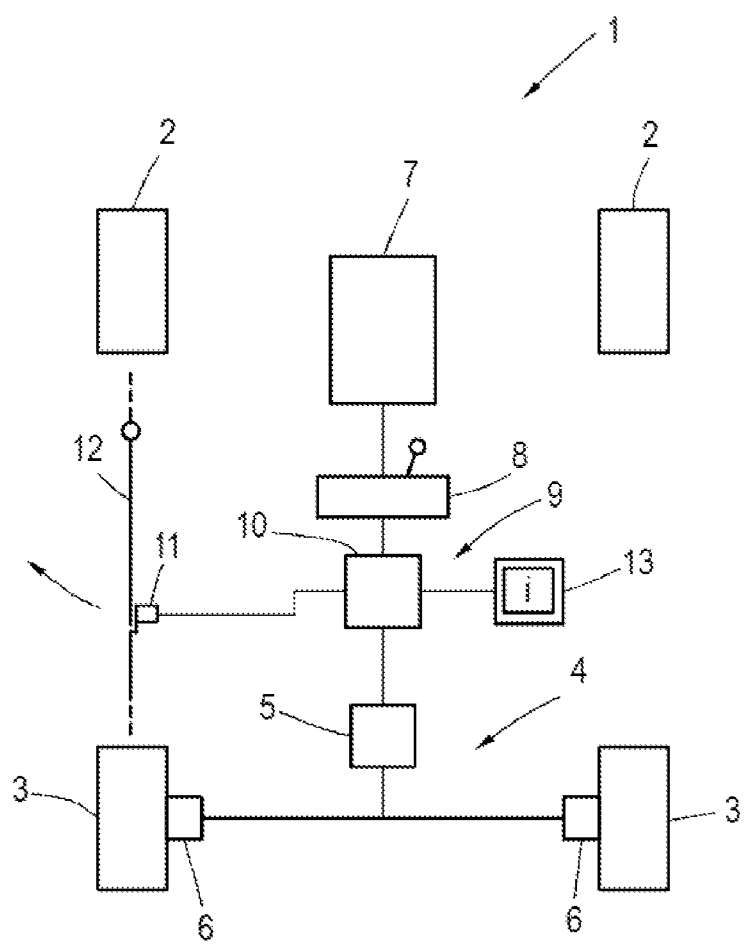
1
2
2
7
8
9
10
12
11
13
4
5
3
3
6
6

WARNING SYSTEM GENERATING WARNING FOR PARKING BRAKE AND AUTOMATIC TRANSMISSION OF MOTOR VEHICLE

CROSS REFERENCE TO RELATED APPLICATIONS

This application is based on and hereby claims priority to International Application No. PCT/EP2014/003379 filed on Dec. 16, 2014 and German Application No. 10 2013 021 661.3 filed on Dec. 19, 2013, the contents of which are hereby incorporated by reference.

BACKGROUND

The invention relates to a motor vehicle comprising an automatic transmission with a P driving stage, an N driving stage and one or more forward and reverse driving stages, an electric parking brake device and an assistance system for outputting warning information.

In modern motor vehicles, an assistance system is used to monitor whether the vehicle has been actively shut down in a secure state by the driver when the driver leaves the vehicle. This secure state is usually issued if the driver has selected the P driving stage via its selector lever and has also engaged said P driving stage in the automatic transmission. However, sometimes the driver does not select the P driving stage, i.e. he shuts off the engine while the selector lever is still, for example, in the usually engaged D driving stage, that is to say a forward driving stage or in the R driving stage, that is to say the reverse driving stage. This is basically possible. If the driver then opens the driver's door, this is interpreted as being an intention to exit, i.e. the assistance system assumes that the driver wishes to leave the vehicle. The opening of the vehicle door is determined by a corresponding sensor with which the control device of the assistance system communicates. If the selector lever is then not in the P driving stage, in previously known vehicles, on the one hand, warning information, for example in the form of a text or flashing information or the like is usually output visually on the display of the combination instrument or a separate monitor, if appropriate assisted by a sound signal. At the same time, the electric parking brake device, which secures and safeguards the vehicle, is activated. The driver can then once more subsequently engage the P driving stage on the basis of this warning information.

However, the subsequent engagement of the P driving stage is actually not necessary after the vehicle has already been shut down in a secure state owing to the actuation of the electric parking brake device. Consequently, the outputting of the warning information is unnecessary and sometimes even confusing, since not every driver knows immediately what action is required of him.

SUMMARY

One possible object is therefore specifying a motor vehicle which is improved compared to the situation.

The inventor proposes a motor vehicle in which the warning information is output only if the parking brake device could not be activated or could not be activated in a fault-free fashion.

According to the proposal, the assistance system is, as before, disengaged before the outputting of the warning information when the driver's door is opened and the parking brake device is simultaneously activated if the P driving stage has not been engaged on the transmission side. The warning information is, however, output only if the electric parking brake could not be engaged in this case, because the electric parking brake system already has a functional defect or could not be engaged in a fault-free fashion, that is to say if a fault occurred during the actuation of the electric parking brake device and owing to this fault it is not ensured that the electric parking brake has also actually been completely activated or if the parking brake was previously actively "overridden" by the driver, for example during maneuvering, wherein the driver releases the parking brake again and then opens the door, so that the driver can look out. That is to say that the warning information is issued only when the vehicle is not braked and has therefore not been safeguarded or a secure state has not been issued, which is the case when a fault has occurred during the actuation of the parking brake device and the parking brake device could not be activated, or could not be activated completely.

This advantageously ensures that unnecessary outputting of warning information does not take place, that is to say the warning information is not output if it is not necessary because a secure state has been adopted. The warning information is output then, and only when the safe state has not been adopted or when, owing to a fault in the ongoing activation operation of the parking brake, it is not ensured that said parking brake has been completely activated.

In one development, the warning information can be output only after the expiry of a predetermined time interval after the detection of a door opening process. If the driver opens the driver's door and if this is detected by a corresponding sensor, it is immediately checked whether the P driving stage is engaged. If this is not the case, the electric parking brake device is in turn immediately actuated. Since depending on the embodiment said parking brake device in some cases requires a certain period of time to apply the vehicle brake completely, that is to say to ensure the secure state, the warning information is output with a certain delay. The time interval is dimensioned in such a way that within the time interval the electric parking brake can be completely activated in all cases. If this does not occur within the time interval or if corresponding fault information is issued within the time interval to the effect that the parking brake could not be activated in a fault-free fashion, the warning information is output after the expiry of the time interval. This time interval can be triggered when the door opening process is detected. Said time interval is, for example, 1-3 seconds, wherein, as stated, it is dimensioned as a function of the normal functional period of the parking brake device which the latter requires until the end position is adopted.

Finally, according to the proposal it can be provided that the warning information can be output immediately when a door opening process is detected and an N driving stage is engaged. That is to say that the warning information is always output immediately if the door opening process is detected, and that the control device of the assistance system also detects that at this time the N driving stage, that is to say the neutral driving stage or the idle state, is engaged. Since the N driving stage has sometimes been engaged intentionally, for example in order to push the vehicle or the like, in this case the electric parking brake device is not automatically actuated to fully engage the brakes of the vehicle. Since in this case an automatic securing function is therefore not activated, the driver can be warned immediately if an intention to exit is detected as a result of the detection of the opening door, since in this case there is no fallback level provided by the parking brake device.

BRIEF DESCRIPTION OF THE DRAWINGS

These and other objects and advantages of the present invention will become more apparent and more readily appreciated from the following description of the preferred embodiments, taken in conjunction with the accompanying drawing of which:

The FIGURE shows a basic illustration of a motor vehicle 1 according to the invention, comprising four wheels 2, 3, the wheels 2 being front wheels and the wheels 3 being rear wheels.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

The FIGURE shows a basic illustration of a motor vehicle 1 according to the inventor's proposal, comprising four wheels 2, 3, the wheels 2 being front wheels and the wheels 3 being rear wheels. The wheels 3 are assigned an electric parking brake device 4, comprising for example a control device 5 and actuators 6 which are provided on the wheel side and which can be actuated by the control device 5. By said actuators 6 it is possible to activate the brake device there, for example a disc brake device, or to move a brake element automatically against the brake disc etc. A person skilled in the art is sufficiently familiar with the design and the basic method of functioning of an electric parking brake device.

Furthermore, an automatic transmission 7 with an assigned selector lever 8 is provided, which selector lever 8 can be activated by the driver and can be used to select, through corresponding sliding into the indicated positions, various driving stages, for example usually a P driving stage (=parking stage), an N driving stage (=neutral stage), an R driving stage (=reverse driving stage) and a D driving stage (=forward driving stage). The corresponding driving stages are set in an electrically controlled fashion on the transmission side, which is also sufficiently known.

Furthermore, an assistance system 9 comprising a control device 10 is provided, which control device 10 serves to warn the driver, who is about to leave the motor vehicle 1, if the vehicle is not in a secured state, by warning information. For this purpose, the control device 10 communicates with a sensor 11 which is assigned to the driver's door 12 which can be opened, as is illustrated by the arrow. The sensor 11, a corresponding door sensor or a door contact detects as soon as the driver's door 12 is opened. Also, in the example shown the control device 10 communicates with the selector lever 8, that is to say the respective selected driving stage of the selector lever 8 is read in and is transmitted to a bus (not shown here in more detail), where it is detected by the control device (alternatively the driving stage signal can also be generated by a transmission control unit and transmitted onto the bus). If the respective driving stage which is selected or engaged at the time of the detection of the opening of the door is the P driving stage, the vehicle is in a secure state, and the outputting of warning information or the actuation of the electric parking brake device 4 by the control device 10 is not necessary.

However, if, for example, the R driving stage or the D driving stage is engaged at the time of detection of the opening of the door, a defined lock is not active on the transmission side, as would be the case in the case of the P driving stage. In order, nevertheless, to shut down the vehicle in a secure state, the electric parking brake device 4, here therefore the control device 5, is then actuated directly with the detection of the opening of the door and detection of the engaged R driving stage or D driving stage, so that the rear wheels 3 are arrested by the actuators 6. If it becomes apparent during this actuation or during the operation of the parking brake device that the latter has been correctly activated and has functioned correctly, therefore that the rear wheels 3 are arrested, a secure state is therefore provided. The vehicle is therefore secured even though the P driving stage is not engaged. The outputting of warning information is not necessary in this case.

However, if a fault occurs during the actuation of the parking brake device 4 or during the activation operation, such that the parking brake device 4 either cannot be actuated or even transmits back a fault message, or a fault occurs during the operation of the actuators 6 or that the previously engaged parking brake is actively released by the driver and the door is subsequently opened, the vehicle is therefore either not secured, if the parking brake device 4 cannot be activated at all or has been released again, or when a fault has occurred during the activation of the parking brake device 4 it not ensured that said parking brake device 4 has completely and correctly fully braked the vehicle. In this case, a secure state is therefore not provided. Since the vehicle is, as stated, not secured by the P driving stage, the outputting of warning information is now displayed on a display 13, wherein the warning information is represented here by "i".

That is to say the warning information is issued to the driver only if it is not ensured that the vehicle could be fully braked to a secure state by the electric parking brake device 4 when the P driving stage is not engaged.

If, after the issuing of a door opening signal, the control device 10 detects that the N driving stage is engaged, a control signal is not output to the electric parking brake device 4 by the control device 10, since in this case automatic full braking is not intended to take place by the parking brake device 4. This is because the driver is intended to have the possibility of shutting down the vehicle in a completely intentional way with the N driving stage. In this case, when the door opening process is detected the warning information "i" is output directly on the display 13. This is because in this case an automatic fallback level is not provided by the parking brake device 4.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A motor vehicle comprising:

an automatic transmission with a Park stage, a Neutral stage, a forward driving stage and a reverse driving stage;

an electric parking brake device; and an assistance system to output warning information when a door of the motor vehicle is open without the Park stage of the transmission being engaged, wherein the warning information is output only if the parking brake device could not be actuated, or could not be actuated in a fault-free fashion, and the parking brake device is an automatic parking brake device that is automatically actuated when the door of the motor vehicle is open and the forward driving stage or the reverse driving stage of the transmission is engaged.

2. The motor vehicle as claimed in claim 1, wherein
the warning information is output only after a predetermined time interval has expired after detecting a door opening process.

3. The motor vehicle as claimed in claim 1, wherein
the warning information is output immediately after detecting a door opening process if the Neutral stage of the transmission is engaged and the parking brake device is not actuated in a fault-free fashion.

4. The motor vehicle as claimed in claim 1, wherein
the assistant system outputs the warning information when the engine is shut off and the door of the motor vehicle is open, without the Park stage of the transmission being engaged and without the parking brake device being actuated in a fault-free fashion.

5. The motor vehicle as claimed in claim 1, wherein the parking brake device is not actuated in a fault-free fashion when at least of the following occurs:
the parking brake device is not actuated,
there is a fault during actuation of the parking brake device, and
the parking brake device was previously actuated and then overridden and released by a driver of the motor vehicle.

6. The motor vehicle as claimed in claim 2, wherein
the predetermined time interval is at least as long as a time interval required to actuate the parking brake device.

7. The motor vehicle as claimed in claim 3, wherein
the parking brake device is not automatically actuated when the door of the motor vehicle is open and the Neutral stage of the transmission is engaged.

8. The motor vehicle as claimed in claim 2, wherein
the warning information is output immediately after detecting the door opening process if the Neutral stage of the transmission is engaged and the parking brake device is not actuated in a fault-free fashion.

9. The motor vehicle as claimed in claim 6, wherein
the warning information is output immediately after detecting the door opening process if the Neutral stage of the transmission is engaged and the parking brake device is not actuated in a fault-free fashion.

10. The motor vehicle as claimed in claim 9, wherein
the parking brake device is not automatically actuated when the door of the motor vehicle is open and the Neutral stage of the transmission is engaged.

11. A motor vehicle comprising:
an automatic transmission with a Park stage, a Neutral stage, a forward driving stage and a reverse driving stage;
an electric parking brake device; and
an assistance system to output warning information when a door of the motor vehicle is open without the Park stage of the transmission being engaged, wherein
the warning information is output only if the parking brake device could not be actuated, or could not be actuated in a fault-free fashion, and
the warning information is output only after a predetermined time interval has expired after detecting a door opening process.

12. The motor vehicle as claimed in claim 11, wherein
the warning information is output immediately after detecting a door opening process if the Neutral stage of the transmission is engaged and the parking brake device is not actuated in a fault-free fashion.

13. The motor vehicle as claimed in claim 11, wherein
the assistant system outputs the warning information when the engine is shut off and the door of the motor vehicle is open, without the Park stage of the transmission being engaged and without the parking brake device being actuated in a fault-free fashion.

14. The motor vehicle as claimed in claim 11, wherein the parking brake device is not actuated in a fault-free fashion when at least of the following occurs:
the parking brake device is not actuated,
there is a fault during actuation of the parking brake device, and
the parking brake device was previously actuated and then overridden and released by a driver of the motor vehicle.

15. The motor vehicle as claimed in claim 11, wherein
the predetermined time interval is at least as long as a time interval required to actuate the parking brake device.

16. The motor vehicle as claimed in claim 12, wherein
the parking brake device is an automatic parking brake device that is automatically actuated when the door of the motor vehicle is open and the forward driving stage or the reverse driving stage of the transmission is engaged, and
the parking brake device is not automatically actuated when the door of the motor vehicle is open and the Neutral stage of the transmission is engaged.

17. The motor vehicle as claimed in claim 15, wherein
the warning information is output immediately after detecting the door opening process if the Neutral stage of the transmission is engaged and the parking brake device is not actuated in a fault-free fashion.

18. The motor vehicle as claimed in claim 17, wherein
the parking brake device is an automatic parking brake device that is automatically actuated when the door of the motor vehicle is open and the forward driving stage or the reverse driving stage of the transmission is engaged, and
the parking brake device is not automatically actuated when the door of the motor vehicle is open and the Neutral stage of the transmission is engaged.

* * * * *